E. W. HENGER.
ONE-PIECE WROUGHT METAL PIPE CONNECTION FOR BATHTUBS.
APPLICATION FILED JUNE 29, 1920.
1,363,181. Patented Dec. 21, 1920.
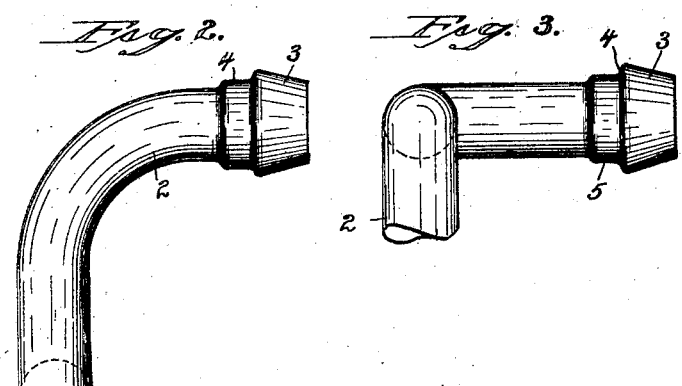
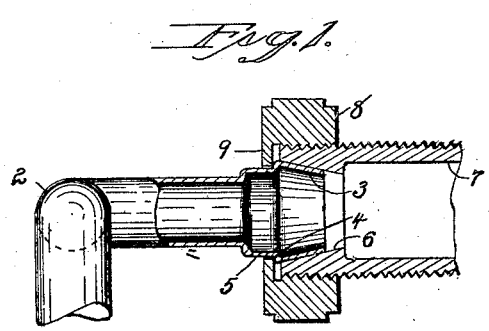

UNITED STATES PATENT OFFICE.

EDWIN W. HENGER, OF WATERBURY, CONNECTICUT, ASSIGNOR TO THE CHASE COMPANIES INC., OF WATERBURY, CONNECTICUT, A CORPOARTION.

ONE-PIECE WROUGHT-METAL PIPE CONNECTION FOR BATHTUBS.

1,363,181.   Specification of Letters Patent.   Patented Dec. 21, 1920.

Application filed June 29, 1920. Serial No. 392,648.

*To all whom it may concern:*

Be it known that I, EDWIN W. HENGER, a citizen of the United States, residing at Waterbury, in the county of New Haven and State of Connecticut, have invented a new and useful Improvement in One-Piece Wrought-Metal Pipe Connections for Bathtubs; and I do hereby declare the following, when taken in connection with the accompanying drawings and the characters of reference marked thereon, to be a full, clear, and exact description of the same, and which said drawings constitute part of this application, and represent, in—

Figure 1, a view partly in side elevation and partly in vertical section of a one-piece wrought-metal pipe-connection for bath tubs, constructed in accordance with my invention.

Fig. 2, a plan view of the pipe-connection.

Fig. 3, a broken view thereof in side elevation.

Heretofore, the bent upper ends of the water-supply pipe-connections for bath tubs have commonly been furnished with independently formed collars, each having a tapering nipple merging at its inner end into a shoulder standing at a right angle to the axis of the collar and merging into a sleeve fitting the pipe, the nipple fitting into a conical seat in the shank of the cock, and the shoulder being engaged by a coupling-nut for drawing the nipple into the seat. The construction above described is not only clumsy and expensive, but objectionable in so far as the collar is liable to work loose and leak. With the end in view of avoiding the objections above set forth, my invention consists in shaping the end of the pipe itself to take the place of such an independently formed collar as above described.

In carrying out my invention, as herein shown, the water-supply pipe 2 which is bent in the usual form, has its end shaped by suitable means to produce an integral, tapering coupling-nipple 3 merging at its larger inner end into a concentric shoulder 4 located at a right angle to the axis of the nipple and merging at its inner end into a concentric collar 5 larger in diameter than the pipe into which it merges. The nipple 3 is adapted to fit snugly into a conical seat 6 in the end of the shank 7 of the cock, which is not shown. The said shank is externally threaded for the reception of a coupling-nut 8 having a flange 9 overhanging the collar 5 for co-acting with the shoulder 4, as shown in Fig. 1, to draw the nipple 3 into the seat 6 and hold it firmly therein.

The construction described is not only cheaper and of a better and more workmanlike appearance than the water-supply pipe-connections of the prior art, but is more reliable, in so far as the nipple and shoulder are formed integral with the pipe and therefore cannot get loose or leak.

Although the bent upper ends of the water-supply pipe-connections for bath-tubs have commonly been furnished with independently formed collars as above stated, I am aware that it has been proposed to swage a tapering nipple upon the end of such a pipe but without the production of a swaged collar interposed between the nipple and the pipe and intermediate in diameter between the same and forming the salient and characteristic feature of my improvement and attended by manufacturing and functional advantages over the prior art since it provides a transitional step between the pipe proper and the largest diameter of the nipple and since it provides also for the use of a nut having a hole so much larger than the diameter of the pipe that it may be readily passed over the abrupt bend thereof without scratching the polish of the pipe or scraping off its nickel finish.

I claim:

A one-piece, wrought-metal, water-supply pipe-connection for bathtubs, characterized by having the end of the pipe enlarged by stretching to form an integral, concentric, tapering coupling-nipple merging at its inner end into a concentric coupling-shoulder standing at a right angle to the axis of the nipple and in turn merging at its inner end into a concentric nut-centering collar intermediate in diameter between the diameter of the said shoulder and pipe and merging at its inner end into the pipe which is stretched and enlarged to produce the said nut-centering collar.

In testimony whereof, I have signed this specification in the presence of two subscribing witnesses.

EDWIN W. HENGER.

Witnesses:
  JOHN S. NEAGLE,
  P. W. BROWN.